United States Patent
Muylaert (10) Patent No.: US 6,860,015 B2
(45) Date of Patent: Mar. 1, 2005

(54) METHOD OF FORMING OPPOSING INTERNALLY PRELOADED CONICAL ELASTOMERIC BEARING ASSEMBLY

(75) Inventor: Neal M. Muylaert, Apache Junction, AZ (US)

(73) Assignee: The Boeing Company, Chicago, IL (US)

( * ) Notice: Subject to any disclaimer, the term of this patent is extended or adjusted under 35 U.S.C. 154(b) by 278 days.

(21) Appl. No.: 09/975,138

(22) Filed: Oct. 10, 2001

(65) Prior Publication Data

US 2003/0066194 A1 Apr. 10, 2003

(51) Int. Cl.[7] .............................................. B21D 53/10
(52) U.S. Cl. ................. 29/898.09; 29/898.07; 403/228
(58) Field of Search ................ 29/898.054, 898.07, 29/898.09, 894.361; 384/222, 235, 236; 403/132, 133, 228

(56) References Cited

U.S. PATENT DOCUMENTS

| | | | |
|---|---|---|---|
| 2,482,488 A | * | 9/1949 | Julien |
| 3,652,185 A | * | 3/1972 | Cresap et al. |
| 3,782,854 A | | 1/1974 | Rybicki |
| 3,862,812 A | | 1/1975 | Gorndt et al. |
| 3,989,126 A | * | 11/1976 | Katzer |
| 4,028,002 A | | 6/1977 | Finney et al. |
| 4,341,499 A | | 7/1982 | Peterson |
| 4,365,936 A | | 12/1982 | Hatch |
| 4,772,151 A | * | 9/1988 | Lammer et al. |
| 4,859,148 A | | 8/1989 | Hibyan |
| 5,286,132 A | * | 2/1994 | Morini |
| 5,601,408 A | | 2/1997 | Hunter et al. |
| 6,413,048 B1 | * | 7/2002 | Muylaert |
| 2003/0068104 A1 | * | 4/2003 | Loftus |

* cited by examiner

Primary Examiner—Eric Compton
(74) Attorney, Agent, or Firm—Black Lowe & Graham PLLC (57) ABSTRACT

A method is provided for producing an elastomeric conical flap bearing assembly for rotary aircraft including an inboard bearing element and outboard bearing element disposed within an outer housing. The outer housing has an outer surface configured with a plurality of radially extending flange elements. The outer housing has an inner surface configured to receive tapered conical bearing elements. A tapered conical elastomeric inboard bearing element is inserted into its outer housing and is bonded to the inner surface. A tapered conical elastomeric outboard bearing element is inserted into the outer housing, wherein the conical tapers of the respective bearing elements are directed in opposing directions. The bearing elements are press-fit together and the outer surface of the outboard bearing is bonded to the inner surface of the outer housing forming a bearing assembly. Simultaneously, an axial pre-load is applied to the bearing assembly. A plurality of bearing coupler lugs are attached to the bearing assembly.

20 Claims, 3 Drawing Sheets

METHOD OF FORMING OPPOSING INTERNALLY PRELOADED CONICAL ELASTOMERIC BEARING ASSEMBLY

RELATED APPLICATION

This application incorporates by reference co-pending application titled "Opposing Conical Elastomeric Bearing Assembly," invented by Robert T. Loftus, attorney docket number BOEI-1-1005.

FIELD OF THE INVENTION

This invention relates generally to the field of forming elastomeric bearing assemblies and specifically to forming preloaded elastomeric bearing assemblies.

BACKGROUND OF THE INVENTION

A key component of a helicopter is the main rotor hub. It provides attachment of the main rotor blades during operation. Rotational power is delivered to the main rotor hub to provide rotational velocity to the blades in order to create aerodynamic lift. The main rotor hub must allow for rotational motion of the blades in the vertical (flap), horizontal (lead-lag), and axial (pitch) directions near the blade root attachment with the hub to accommodate flight control authority and dynamic stability. Main rotor hub systems that accommodate these motions with discrete hinge mechanisms are referred to as fully articulated hubs. Through out the history of the helicopter, engineers have struggled to provide these rotational freedoms with bearing systems that can accommodate high frequency and high amplitude oscillatory motion under high trust loading created by the centrifugal force of the rotating blades. Elastomeric bearings have become an industry standard for accommodating flap-wise motion in articulated hub systems. These bearings are composed of elastomeric material that allows for shear compliance within the elastomer for rotational freedom while reacting radial centrifugal force in compression.

Elastomeric conical bearings are commonly used in bearing assemblies for helicopter rotor systems to control rotor motion. The bearing assemblies are axially preloaded to prevent the conical bearing elements from experiencing a resultant tensional load. Currently, mono-directional bearing elements are employed at each attachment site of the main rotor hub. The prior art design creates an extended force couple resulting in a bearing pre-load path extending through the main rotor hub center body. The hub center body must be designed to carry the extra loading. The extra design requirements add weight to the overall rotor hub reducing the aircraft's load capacity and fuel efficiency.

SUMMARY OF THE INVENTION

The invention provides a method of efficiently forming a flap bearing assembly for rotary aircraft. A method of producing an elastomeric conical flap bearing assembly for rotary aircraft includes disposing an inboard bearing element and outboard bearing element within an outer housing. The outer housing has an outer surface configured with a plurality of radially extending flange elements. The outer housing has an inner surface configured to receive tapered conical bearing elements. A tapered conical elastomeric inboard bearing element is inserted into its outer housing and is bonded to the inner surface. Also, a tapered conical elastomeric outboard bearing element is inserted into the outer housing, wherein the conical tapers of the respective bearing elements are directed in opposing directions. The bearing elements are press-fit together and the outer surface of the outboard bearing is bonded to the inner surface of the outer housing forming a bearing assembly. Simultaneously, an axial pre-load is applied to the bearing assembly. A plurality of bearing coupler lugs are attached to the bearing assembly.

The proposed invention provides a unique flap bearing arrangement by localizing the pre-load within each flap bearing assembly and, thus, eliminates the necessity for the transfer of the pre-load through the hub structure. The elimination of bearing pre-load through the hub structure significantly reduces weight of the rotor hub assembly. Many components, including the bearing attachment flanges on the hub center body as well as the bearing housings can be configured to accommodate only the design flight and static loads without having to carry the off axis bearing pre-loads. The unique design of the instant invention yields a 60 to 100 pound weight reduction of the main rotor hub.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
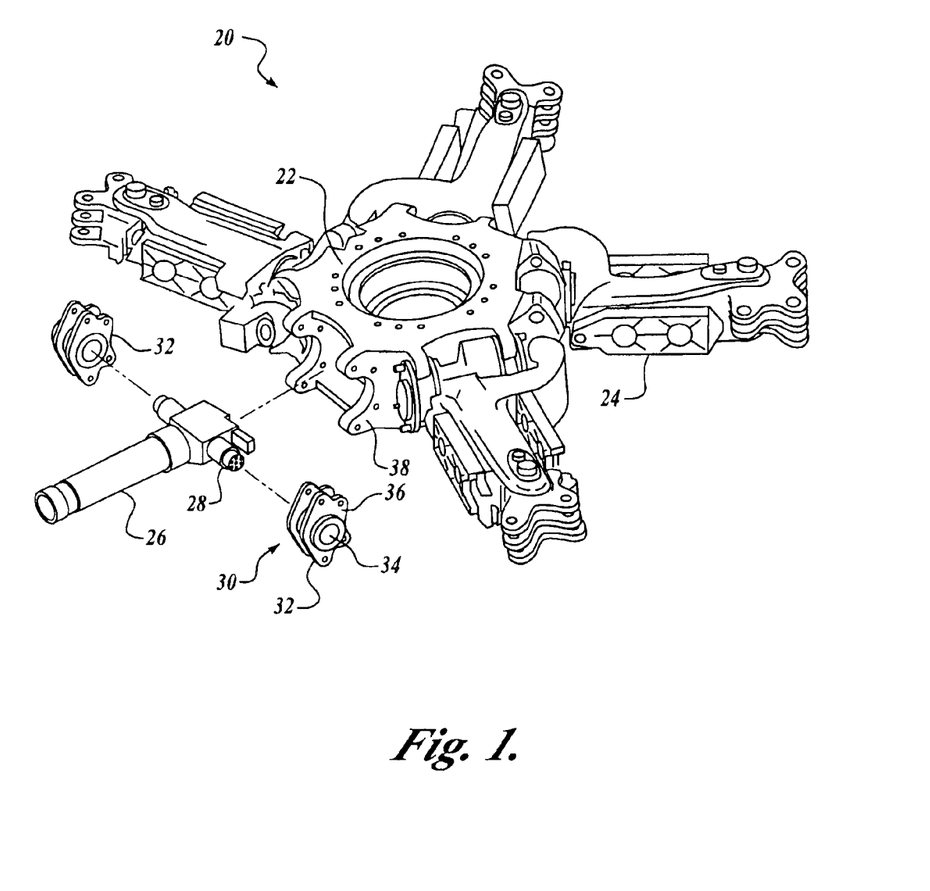
FIG. 1 is an isometric view of an articulated hub assembly.

FIG. 1 depicts a fully articulated hub assembly 20 that includes a pre-loaded, opposed flat bearing assembly 30 that maintains a force couple bearing pre-load path entirely within the flat bearing assembly 30. The hub assembly 20 includes a plurality of rotor assemblies 24 radially attached to a hub center body 22. The articulated hub assembly 20 is designed to allow and to control the flap, pitch and lead-lag motion of an aircraft rotor.

In a presently preferred embodiment, the rotor assembly 24 includes a tie bar 26. The tie bar 26 is a substantially cylindrical shaped element with having a pair of radially opposed tie bar journals 28 at an end. Each tie bar journal is designed to receive the flap bearing assembly 30. The bearing assembly 30 extends over the journal 28 attaching itself to the journal 28 via a plurality of alignment dowels and a tie bar attachment lug (not shown). The tie bar 26 and bearing assembly 30 combination attach the rotor assembly 24 to the hub center body 22 and control flap motion of the rotor assembly 24.

The flap bearing assembly 30 includes an inboard bearing element 32 and an outboard bearing element 34 contained within an outer housing 42 to form the bearing assembly 30. The outer housing 42 includes two pair of radially extending bearing flanges 36 configured to mate with a hub yolk 38 of the hub center body 22. A plurality of flange bores 60 align with yolk bores 40 allowing fasteners (not shown) to rigidly attach the structures.

Figure 2:
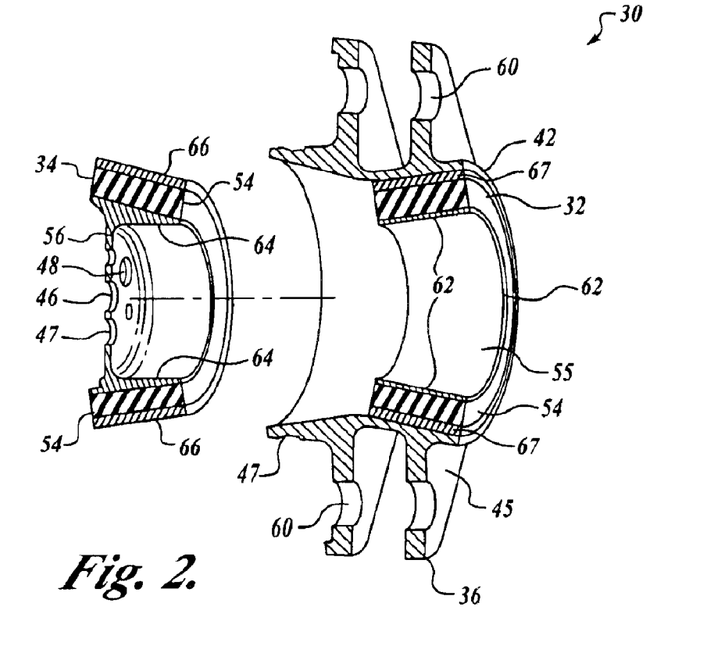
FIG. 2 is an exploded view of the bearing assembly.

FIG. 2 depicts an exploded view of the flap bearing assembly 30. The bearing assembly 30 includes an outboard bearing element 34 and an inboard bearing element 32 disposed within an outer housing 42. The outer housing 42 includes a first section 45 and a second section 47.

The manufacture of the bearing assembly is a several step process. Initially, a primary bond is created within each bearing element. More specifically, the inner and outer race of each bearing element, 64 and 66 respectively for the inboard bearing element, 64 and 66 for the outboard bearing element, is bonded to an elastomeric element 54 disposed between the inner and outer race of each bearing element. The primary bond adheres the race elements directly to the elastomeric element 54. In a presently preferred embodiment, the primary bond is created by injecting the elastomeric element into a mold created by the placement of the respective race elements. Upon solidification of the injected elastomeric material the primary bond is formed. However, other primary bond methods are considered within the scope of this invention. Once the primary bond is created between the inner race and the outer race of inboard bearing element 32 and the outboard bearing element 34 the respective bearing elements are ready for the next process.

The inboard bearing element 32 is inserted into a first section 45 of the outer housing 42. The inboard bearing element 32 is inserted with the conical taper directed toward a second section 47 of the outer housing. Upon inserting of the internal bearing element 32, the inner race of the inboard bearing element 62 extends a distance into an area of the second section 47.

Upon insertion or slightly thereafter, a secondary bond is created between the outer race of the inboard bearing element 67 and an inner surface of the outer housing 42. In the preferred embodiment, the secondary bond is an adhesion. However, any other bond commonly known in the art is considered within the scope of this invention.

Figure 3:
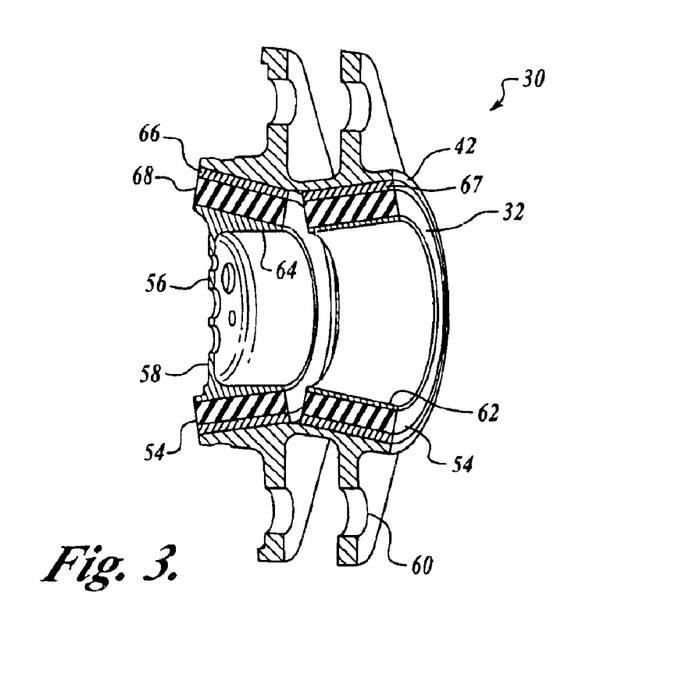
FIG. 3 is an isometric view of the bearing assembly.

FIG. 3 depicts another view of the bearing assembly 40. The outboard bearing element 34 is inserted into the second section 47 of the outer housing 42. The outboard bearing element 34 is inserted with the conical taper directed toward the inboard bearing element 32, thus creating an opposed bearing couple.

The insertion of the outboard bearing 34 into the outer housing 42 yields several occurrences. First, the inner race of the outboard bearing element 64 is pressure fit into the inner race of the outboard bearing element 64. Simultaneously, another secondary bond, similar to the other secondary bond, is created between the outer race of the outboard bearing 66 and an inner surface of the outer housing 42. Also, simultaneously, the bearing pre-load is applied to the bearing assembly. The bearing pre-load is preferably about 8,500 to about 15,000 pounds. However, any pre-load range is considered within the scope of this invention. At this point, the bearing assembly is nearly complete.

Figure 4:
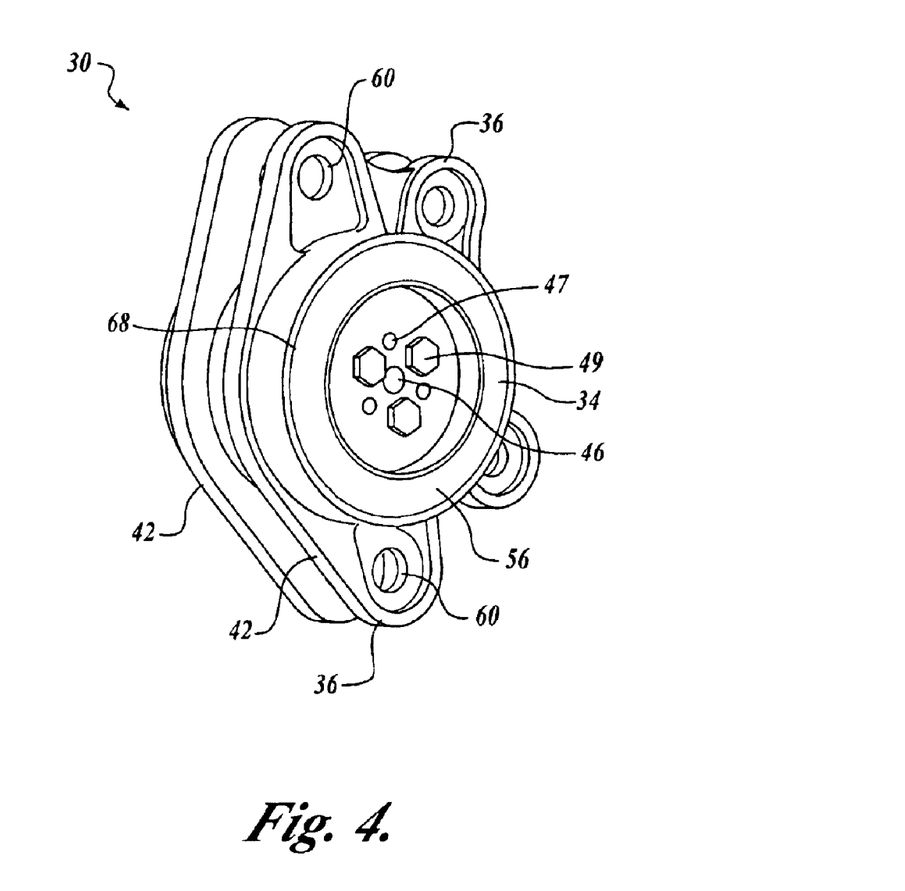
FIG. 4 is an alternative isometric view of the bearing assembly.

FIG. 4 depicts a completed assembly view of the bearing assembly 30 as viewed in the direction of the taper of the outboard bearing element 34. More specifically, a plurality of bearing coupler lugs 49 are employed to help maintain the bearing assembly 30 integrity. In the preferred embodiment, three coupler lugs 49 are employed with the bearing assembly. However, any number of coupler lugs are employable with this invention.

The coupler lugs 49 serve two primary purposes. First, the lugs 49 serve as a redundant secondary bond 68. More specifically, the lugs 49 assist the secondary bond in carrying the axial pre-load. Secondly, the lugs 49 prevent any rotational displacement of the respective bearing elements.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method of forming an internally preloaded opposing conical elastomeric bearing assembly, comprising:
   forming an inboard bearing element, the inboard bearing element including an inner race primarily bonded to an elastomeric element and an outer race primarily bonded to the elastomeric element;
   forming an outboard bearing element, the outboard bearing element including an inner race primarily bonded to an elastomeric element and an outer race primarily bonded to the elastomeric element;
   forming an outer housing, the outer housing having an outer surface and an inner surface, the outer surface having a plurality of flange sections extending radially from the outer surface, the inner surface configured to receive inboard and the outboard bearing elements;
   inserting the inboard bearing element into the outer housing;
   bonding the outer race of the inboard bearing element to the inner surface of the outer housing to form a first secondary bond;
   inserting the outboard bearing element into the outer housing such that a frictional connection is achieved between the inner race of the inboard bearing element and the inner race of the outboard element;
   bonding the outer race of the outboard bearing element to the inner surface of the outer housing to form a second secondary bond;
   pressing the inboard bearing element and the outboard bearing element together to create an axial pre-load; and
   attaching a plurality of bearing coupler lugs axially through the inboard bearing element and the outboard bearing element.

2. The method of claim 1, wherein the first and second, secondary bonds are adhesion bonds.

3. The method of claim 1, wherein pressing the outboard bearing element further comprises:
   joining the inner race of the inboard bearing element with the inner race of the outboard bearing element by a friction fit.

4. The method of claim 1, wherein the axial pre-load is in a range from about 8,500 pounds to about 15,000 pounds.

5. The method of claim 1, wherein the bearing assembly is a rotary aircraft flap bearing assembly.

6. A method of forming an internally preloaded opposing conical elastomeric bearing assembly, comprising:
   forming an outer housing having a first section and a second section, the outer housing including an outer surface having a plurality of flange portions radially extending therefrom, the outer housing including an inner surface configured to receive a bearing element in the first section and a bearing element in the second section;
   forming a tapered conical inboard bearing element including an outer race primarily bonded to an elastomeric element and an inner race primarily bonded to the elastomeric element, the inner race including an extended portion extending beyond the elastomeric element and having a closed end;
   inserting the inboard bearing element into the first section of the outer housing, the conical taper bearing element being inwardly directed;

bonding the outer race of the inboard bearing element to the inner surface of the outer housing in the first section to form a first secondary bond;

forming a tapered conical outboard bearing element, the bearing element including an outer race primarily bonded to an elastomeric element and an inner race primarily bonded to the elastomeric element, the inner race including a receiving portion mated to receive the extended portion of the inner race of the inboard bearing, the inner race forming an outer plate;

inserting the outboard bearing element into the second section of the outer housing, the conical taper bearing element being inwardly directed, taper directions of the inserted bearing elements opposing one another and respective inner races frictionally engaging one another, an axial pre-load being applied to the bearing elements;

bonding the outer race of the outboard bearing element to the inner surface of the outer housing in the first section to form a second secondary bond; and connecting the respective bearing element with a plurality of bearing coupler lugs.

7. The method of claim 6, wherein the first and second secondary bonds are adhesion bonds.

8. The method of claim 6, wherein the axial pre-load is in a range from about 8,500 pounds to about 15,000 pounds.

9. The method of claim 6, wherein the bearing assembly is a rotary aircraft flap bearing assembly.

10. A method of forming a fully articulated rotary hub assembly for rotary aircraft, comprising:

forming a hub center body including a plurality of attachment sections positioned about a periphery of the hub center body, the attachments sections being configured to receive a plurality of bearing assemblies, creating a plurality of rotor assemblies including a tie bar having a pair of tie bar journal sections configured to be inserted into the bearing assemblies;

forming a internally preloaded bearing assembly including an outer housing having an outer surface and an inner surface, the outer surface being configured with a plurality of radially extending flange sections configured to attach to the attachment sections of the hub center body, the inner surface being configured to receive a pair of opposed taper conical elastomeric bearing elements, each bearing clement having an inner race and an outer race, each inner race forming an end plate; wherein the inner races are configured to receive the tie bar journal sections of the rotor assembly;

inserting the tie bar journal section of the rotor assembly into the bearing assembly; and, connecting the flange sections of the bearing assembly to the attachment sections of the hub center body.

11. The method of claim 10, further comprising axially pre-loading the bearing elements within the bearing assembly.

12. The method of claim 11, wherein the axial pre-load is in a range from about 8,500 pounds to about 15,000 pounds.

13. The method of claim 10, wherein the outer race of the bearing elements are bonded to the inner surface of the outer housing.

14. The method of claim 13, wherein the bond is an adhesion bond.

15. The method of claim 10, wherein the inner race of one bearing element is frictionally attached to the inner race of the other bearing element.

16. The method of claim 10, further comprising fastening the bearing assembly to the tie bar journal by a fastener extending axially through the bearing assembly and into an end of the tie bar journal.

17. The method of claim 16, wherein the fastener is a bolt.

18. The method of claim 10, wherein the bearing assembly allows for flap motion of the rotor assembly relative to the hub center body.

19. The method of claim 10, further comprising connecting the respective bearing elements to each other by a plurality of bearing element fasteners extending through the end plates of each inner race.

20. The method of claim 19, wherein the fasteners are bolts.

* * * * *

UNITED STATES PATENT AND TRADEMARK OFFICE
CERTIFICATE OF CORRECTION

| | | |
|---|---|---|
| PATENT NO. | : 6,860,015 B2 | |
| APPLICATION NO. | : 09/975138 | |
| DATED | : March 1, 2005 | |
| INVENTOR(S) | : Neal M. Muylaert and Robert T. Loftus | |

It is certified that error appears in the above-identified patent and that said Letters Patent is hereby corrected as shown below:

Delete Title page and substitute attached Title page therefor.

(75) Inventors: Neal M. Muylaert -- and Robert T. Loftus --

Delete Drawing Sheets 1-3 and substitute attached sheets 1-3 therefor.

at col. 2, line 28, after "exploded" please insert -- cross sectional --;

at col. 2, line 59, please replace "yolk" with -- yoke --;

at col. 2, line 61, please replace "yolk" with -- yoke --;

at col. 2, line 63, after "exploded" please insert -- cross sectional --;

at col. 3, lines 5-6, please replace "element, 64 and 66 for the outboard bearing element," with -- element 34, 62 and 67 for the outboard bearing element 32, --;

at col. 3, line 16, after "inner race" please insert -- 64 and 62 -- and after "outer race" please insert -- 66 and 67 --;

at col. 3, line 17, please replace "32" with -- 34 -- and please replace "34" with -- 32, --;

at col. 3, line 19, please replace "32" with -- 34 --;

at col. 3, line 21, please replace "32" with -- 34 --;

at col. 3, line 23, please replace "32" with -- 34 --;

at col. 3, line 24, please replace "62" with -- 64 --;

at col. 3, line 27, after "outer race" please insert -- 66 --;

at col. 3, line 28, please replace "67" with -- 34 -- and after "surface" please insert -- 55 --;

at col. 3, line 32, please replace "40" with -- 30 --;

at col. 3, line 33, please replace "outboard" with -- inboard -- and "34" with -- 32 --;

at col. 3, line 34, please replace "outboard" with -- inboard --;

UNITED STATES PATENT AND TRADEMARK OFFICE
CERTIFICATE OF CORRECTION

PATENT NO. : 6,860,015 B2
APPLICATION NO. : 09/975138
DATED : March 1, 2005
INVENTOR(S) : Neal M. Muylaert and Robert T. Loftus It is certified that error appears in the above-identified patent and that said Letters Patent is hereby corrected as shown below:

at col. 3, line 35, please replace "34" with -- 32 --;

at col. 3, line 36, please replace "inboard" with -- outboard -- and "32" with -- 34 --;

at col. 3, line 39, please replace "34" with -- 32 --;

at col. 3, line 40, after "inner race" please insert -- 62 --;

at col. 3, line 41, please replace "outboard" with -- inboard -- and "64" with -- 32 --;

at col. 3, line 42, after "inner race" please insert -- 64 -- and please replace "64" with -- 34 --;

at col. 3, line 44, after "outer race" please insert -- 67 --;

at col. 3, line 45, please replace "outboard bearing 66" with -- inboard bearing 32 -- and after "inner surface" please insert -- 55 --; and at col. 3, line 61, please replace "as" with -- with --.

Signed and Sealed this

Fourteenth Day of November, 2006

JON W. DUDAS
*Director of the United States Patent and Trademark Office*

(12) United States Patent
Muylaert (10) Patent No.: US 6,860,015 B2
(45) Date of Patent: Mar. 1, 2005

(54) METHOD OF FORMING OPPOSING INTERNALLY PRELOADED CONICAL ELASTOMERIC BEARING ASSEMBLY

(75) Inventor: Neal M. Muylaert, Apache Junction, AZ (US)

(73) Assignee: The Boeing Company, Chicago, IL (US)

( * ) Notice: Subject to any disclaimer, the term of this patent is extended or adjusted under 35 U.S.C. 154(b) by 278 days.

(21) Appl. No.: 09/975,138

(22) Filed: Oct. 10, 2001

(65) Prior Publication Data
US 2003/0066194 A1 Apr. 10, 2003

(51) Int. Cl.⁷ .................................. B21D 53/10
(52) U.S. Cl. .................. 29/898.09; 29/898.07; 403/228
(58) Field of Search .............. 29/898.054, 898.07, 29/898.09, 894.361; 384/222, 235, 236; 403/132, 133, 228

(56) References Cited

U.S. PATENT DOCUMENTS

| | | | |
|---|---|---|---|
| 2,482,488 A | * | 9/1949 | Julien |
| 3,652,185 A | * | 3/1972 | Cresap et al. |
| 3,782,854 A | | 1/1974 | Rybicki |
| 3,862,812 A | | 1/1975 | Gorndt et al. |
| 3,989,126 A | * | 11/1976 | Katzer |
| 4,028,002 A | | 6/1977 | Finney et al. |
| 4,341,499 A | | 7/1982 | Peterson |
| 4,365,936 A | | 12/1982 | Hatch |
| 4,772,151 A | * | 9/1988 | Lammer et al. |
| 4,859,148 A | | 8/1989 | Hibyan |
| 5,286,132 A | * | 2/1994 | Morini |
| 5,601,408 A | | 2/1997 | Hunter et al. |
| 6,413,048 B1 | * | 7/2002 | Muylaert |
| 2003/0068104 A1 | * | 4/2003 | Loftus |

* cited by examiner

*Primary Examiner*—Eric Compton
(74) *Attorney, Agent, or Firm*—Black Lowe & Graham PLLC (57) ABSTRACT

A method is provided for producing an elastomeric conical flap bearing assembly for rotary aircraft including an inboard bearing element and outboard bearing element disposed within an outer housing. The outer housing has an outer surface configured with a plurality of radially extending flange elements. The outer housing has an inner surface configured to receive tapered conical bearing elements. A tapered conical elastomeric inboard bearing element is inserted into its outer housing and is bonded to the inner surface. A tapered conical elastomeric outboard bearing element is inserted into the outer housing, wherein the conical tapers of the respective bearing elements are directed in opposing directions. The bearing elements are press-fit together and the outer surface of the outboard bearing is bonded to the inner surface of the outer housing forming a bearing assembly. Simultaneously, an axial pre-load is applied to the bearing assembly. A plurality of bearing coupler lugs are attached to the bearing assembly.

20 Claims, 3 Drawing Sheets